(12) United States Patent
Zhang et al.

(10) Patent No.: US 12,112,722 B1
(45) Date of Patent: Oct. 8, 2024

(54) ADAPTIVE ADJUSTMENT SYSTEM AND METHOD FOR BRIGHTNESS OF HOLOGRAPHIC WAVEGUIDE DISPLAY DEVICE

(71) Applicant: SOUTHEAST UNIVERSITY, Nanjing (CN)

(72) Inventors: Yuning Zhang, Nanjing (CN); Zhuang Liu, Nanjing (CN); Jin Ding, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/712,707

(22) PCT Filed: Dec. 29, 2022

(86) PCT No.: PCT/CN2022/143664
§ 371 (c)(1),
(2) Date: May 23, 2024

(87) PCT Pub. No.: WO2023/134466
PCT Pub. Date: Jul. 20, 2023

(30) Foreign Application Priority Data

Jan. 17, 2022 (CN) .......................... 202210050111.8

(51) Int. Cl.
G09G 3/32 (2016.01)
G09G 5/10 (2006.01)
G03H 1/00 (2006.01)
G03H 1/02 (2006.01)

(52) U.S. Cl.
CPC ....... *G09G 5/10* (2013.01); *G03H 2001/0088* (2013.01); *G03H 2001/0216* (2013.01); *G09G 2320/0646* (2013.01)

(58) Field of Classification Search
CPC ............. G09G 3/32; G09G 2320/0646; G03H 2001/0088
See application file for complete search history.

(56) References Cited

U.S. PATENT DOCUMENTS

| 11,854,443 B2 * | 12/2023 | Kim ........................ G03H 1/265 |
| 2016/0154458 A1 * | 6/2016 | Liu ....................... H04N 13/373 348/40 |

(Continued)

FOREIGN PATENT DOCUMENTS

| CN | 109116559 A | 1/2019 |
| CN | 110221439 A | 9/2019 |

(Continued)

OTHER PUBLICATIONS

Binocular holographic display with pupil space division method; 2016—Jungwuen (Year: 2016).*

(Continued)

*Primary Examiner* — Luis Perez-Fuentes
(74) *Attorney, Agent, or Firm* — Bayramoglu Law Offices LLC

(57) ABSTRACT

An adaptive adjustment system and method for the brightness of a holographic waveguide display device is provided. The adaptive adjustment system includes five functional modules: a computer control module, a driving and adjustment module, a micro image source display module, an optical waveguide transmission module and an ambient light acquisition module. A video signal is provided by the computer control module and is then transmitted under the control of the driving and adjustment module to illuminate the micro image source display module, and light information of the micro image source display module is finally transmitted to human eyes by means of the optical waveguide transmission module to realize display. The ambient light acquisition module is used for acquiring environmental (Continued)

illuminance information and transmitting the environmental illuminance information to the driving and adjustment module to change the brightness of the micro image source display module.

2 Claims, 4 Drawing Sheets

(56) References Cited

U.S. PATENT DOCUMENTS

2020/0363772 A1* 11/2020 Popov .................. G03H 1/2286
2024/0078941 A1* 3/2024 Kim ..................... G03H 1/2286

FOREIGN PATENT DOCUMENTS

| CN | 111819488 A | 10/2020 |
| CN | 113406800 A | 9/2021 |
| CN | 114296243 A | 4/2022 |

OTHER PUBLICATIONS

ETRI Journal—2014—Park—Digital Holographic Display System with Large Screen Based on Viewing Window Movement for 3D; Park (Year: 2014).*

Holographic augmented reality Head-up display with eye tracking and steering light source; Kim—2016 (Year: 2016).*

* cited by examiner

ADAPTIVE ADJUSTMENT SYSTEM AND METHOD FOR BRIGHTNESS OF HOLOGRAPHIC WAVEGUIDE DISPLAY DEVICE

CROSS REFERENCE TO THE RELATED APPLICATIONS

This application is the national phase entry of International Application No. PCT/CN2022/143664, filed on Dec. 29, 2022, which is based upon and claims priority to Chinese Patent Application No. 202210050111.8, filed on Jan. 17, 2022, the entire contents of which are incorporated herein by reference.

TECHNICAL FIELD

The invention relates to the field of holographic waveguide, in particular to an adaptive adjustment system and method for the brightness of a holographic waveguide display device.

BACKGROUND

The holographic waveguide display technique (hereinafter referred to as "the technique"), as a method for realizing augmented reality (AR), has a great application prospect in entertainment, movies and music, military and other aspects. The micro display image source is a key component of the technique, and the display effect of the micro image source directly determines the quality of a final imaging effect. With the gradual deepening of the technique, the requirements for the micro image source are becoming increasingly higher.

Considering that the technique is generally applied to head-mounted display devices and the ambient light in an environment where the head-mounted display devices are used will change with the movement of human heads, the brightness of the micro display image source needs to be adjusted in real time according to the change of the ambient light. If the brightness of the micro display image source is manually adjusted every time, the operation complexity will be increased, and the viewing experience will be possibly reduced due to improper adjustment. Therefore, the invention provides a method for adaptively adjusting the brightness of the micro image source based on an illuminance sensor. By adopting this method, the brightness of the micro image source does not need to be manually adjusted anymore, thus improving the practicability of devices.

SUMMARY

As shown in FIG. 2 and FIG. 3, the invention provides an adaptive adjustment system for the brightness of a holographic waveguide display device, including five modules which are a computer control module (1), a driving and adjustment module (2), a micro image source display module (3), an optical waveguide transmission module (4) and an ambient light acquisition module (5), as well as a detachable bracket (6). The computer control module (1) is a computer or a mobile phone and mainly used for providing a control signal and a video signal to a micro image source. The driving and adjustment module (2) mainly includes a decoding chip and a microprogrammed control unit (MCU) and is mainly used for illuminating the micro image source and changing display parameters of the micro image source to realize a better display effect. The micro image source display module (3) includes a micro display (7) and a driving circuit and is used for generating light information and transmitting the light information to the optical waveguide transmission module (4). The optical waveguide transmission module (4) mainly includes a holographic waveguide plate (12) and a collimating lens (8). The holographic waveguide plate (12) includes an in-coupling grating (9), a glass substrate (10) and an out-coupling grating (11). The optical waveguide transmission module (4) is mainly used for transmitting light of the micro display (7) to realize AR display. The ambient light acquisition module (5) mainly includes an illuminance sensor and is mainly used for acquiring illuminance information of ambient light and feeding the illuminance information back to the MCU in real time to allow the MCU to adjust the brightness of the micro image source display module (3) according to the illuminance information.

In order to accurately adjust the brightness of the micro image source display module (3) according to the illuminance information acquired by the ambient light acquisition module (5), the relationship between display brightness and environmental illuminance needs to be determined in advance, a preliminary experiment for calibrating the "display brightness-environmental illuminance" relationship needs to be carried out in advance, and the relationship is saved in the MCU, such that the brightness of the micro image source display module (3) can be accurately adjusted in real time.

Beneficial effects: the brightness of existing holographic waveguide display devices is generally adjusted manually, thus increasing the operation complexity and reducing the viewing experience; by adopting the invention, the display brightness of holographic waveguide display devices can be changed automatically according to ambient light and does not need to be manually adjusted, and users can further adjust the brightness according to their habits after adaptive adjustment, thus improving the flexibility and expanding the application range.

DETAILED DESCRIPTION OF THE EMBODIMENTS

Figure 1:
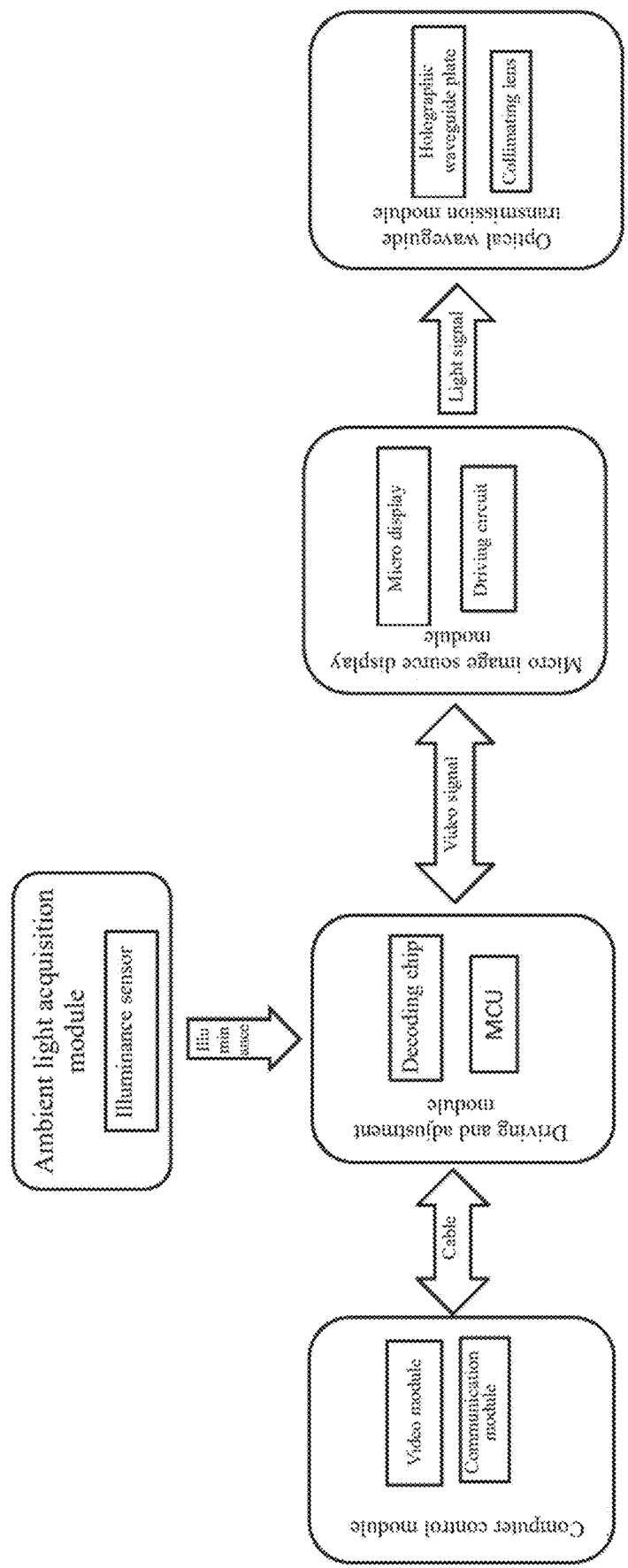
FIG. 1 is an overall structural diagram of an adaptive adjustment system for the brightness of a holographic waveguide display device.
Figure 2:
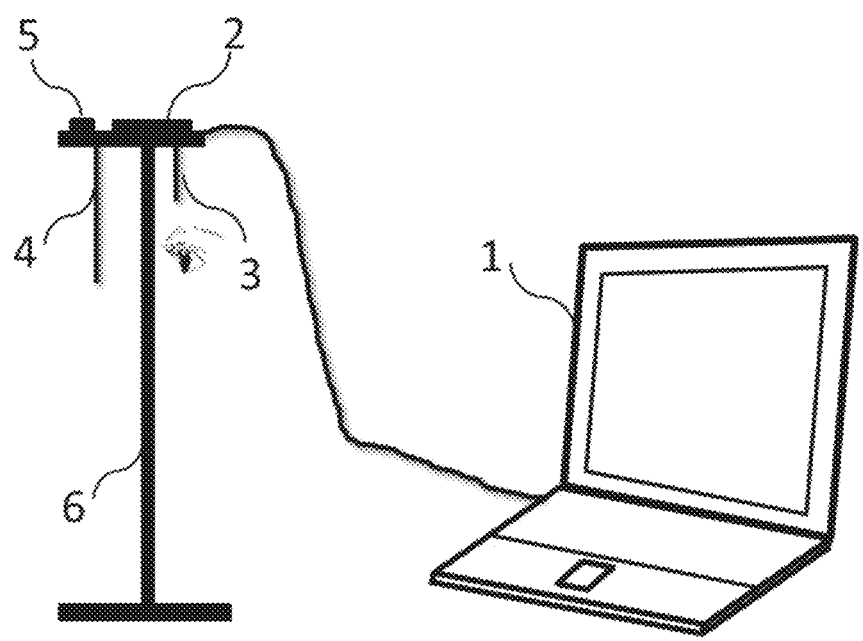
FIG. 2 is a schematic diagram of a holographic waveguide display device.
Figure 3:
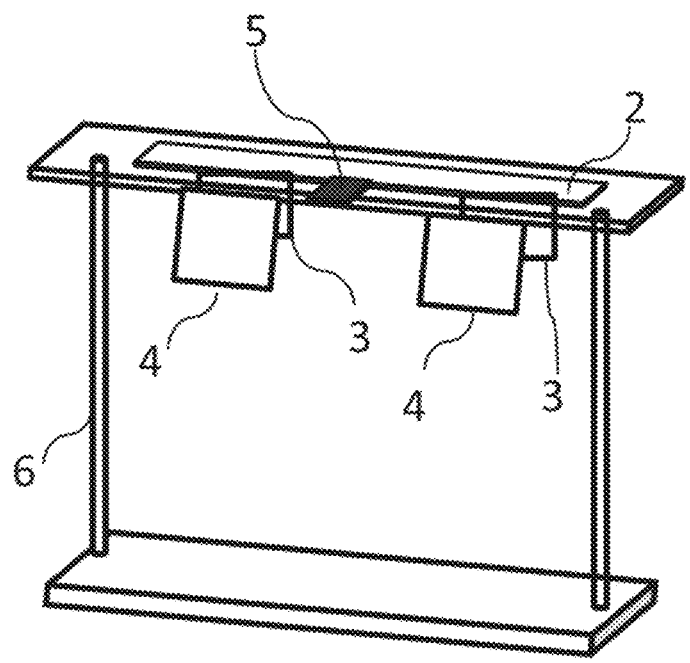
FIG. 3 is a partial feature diagram of the holographic waveguide display device.
Figure 4:
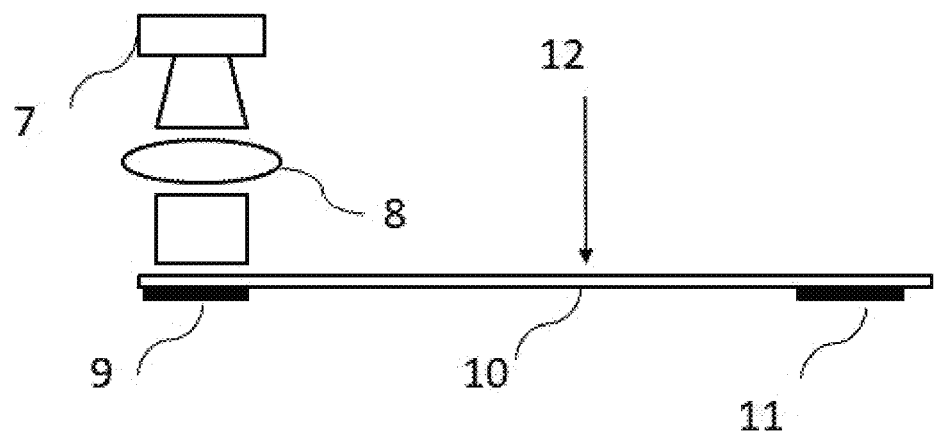
FIG. 4 is a structural diagram of holographic waveguide imaging.

To gain a better understanding of the purposes, technical solutions and advantages of the embodiments of the invention, the technical solutions in the embodiments of the invention will be clearly and completely described below in conjunction with the accompanying drawings of these embodiments. Obviously, the embodiments described are partial embodiments of the invention and not all embodiments. All other embodiments obtained by those ordinarily skilled in the art according to the following ones without creative labor should also fall within the protection scope of the invention.

Embodiment 1

Referring to FIG. 1-FIG. 6, Embodiment 1 provides an adaptive adjustment method for the brightness of a holographic waveguide display device, including the following steps:

S1, overall specifications and feature parameters of a holographic waveguide display device, mainly including the size, final imaging brightness, exit pupil, field of view (FOV) and other information of the whole device, are determined, and types of all modules are determined according to the information.

S2: type selection of related devices: related devices are selected according to the determined overall specifications and feature parameters. The type selection of four modules, namely a driving and adjustment module 2, a micro image source display module 3, an optical waveguide transmission module 4 and an ambient light acquisition module 5, needs to be taken into account. First, as for the driving and adjustment module 2, whether the function and size of an MCU of the driving and adjustment module 2 meet requirements needs to be taken into account, and the decoding rate of a decoding chip of the driving and adjustment module 2 should also be taken into account. As for the micro image source display module 3, a micro display 7 of the micro image source display module 3 should have a high resolution, contrast and brightness and a small size. As for the optical waveguide transmission module 4, structural features of an in-coupling grating 9 and an out-coupling grating 11 of the optical waveguide transmission module 4 need to be determined according to the FOV and exit pupil for final imaging, and then specifications and parameters of a collimating lens 8 of the optical waveguide transmission module 4 are finally determined by taking into account the micro display 7 and a holographic waveguide plate 12. Finally, the type of the ambient light acquisition module 5 is determined according to the sampling rate and accuracy of an illuminance sensor.

S3, a micro image source is illuminated preliminarily. After related devices are selected, a computer control module 1, the driving and adjustment module 2 and the micro image source display module 3 are connected by means of a hardware circuit, and then software drive codes are written into the MCU to preliminarily illuminate the micro image source display module 3.

S4, a holographic waveguide display device is constructed. The micro display 7 which has been illuminated up in S3 and the optical waveguide transmission module 4 are combined to allow light of the micro image source display module 3 to pass through the optical waveguide transmission module 4 to reach human eyes to realized AR display. The key of this step is to adjust the position of the micro image source display module 3 with respect to the collimating lens and the waveguide plate in the optical waveguide transmission module 4 to realize a good imaging effect.

S5, the ambient light acquisition module 5 is embedded. After the holographic waveguide display device is successfully constructed by S1-S4, the ambient light acquisition module 5 needs to be embedded in the holographic waveguide display device to realize adaptive adjustment of the brightness according to environmental illuminance information. The ambient light acquisition module 5 needs to establish communication with the MCU in the driving and adjustment module 2 to transmit illuminance information, and the illuminance information is transmitted by the MCU to the computer control module 1 be displayed. Finally, the illuminance information is compared with a result obtained by a standard illuminometer to correct illuminance data of the ambient light acquisition module 5. Here, it should be noted that the ambient light acquisition module 5 needs to be installed at the front end of the device to be sufficiently observed by human eyes.

S6, a "display brightness-environmental illuminance" relationship between display brightness and environmental illuminance is obtained. The Weber-Fechner law proposes that the actual physical intensity is not in linear relation with the perception intensity. The perception intensity grows at a slower rate than the physical intensity, the physical intensity grows exponentially, while the perception intensity grows arithmetically. The brightness S precepted by human eyes and the actual brightness B also follow the Weber-Fechner law.

$$S = K\ln B + S_0 \quad (1)$$

K is a constant, and $S_0$ indicates the brightness precepted by human eyes when the actual brightness is 0. The relationship between display brightness L and environmental illuminance E is expressed by a similar transfer function:

$$L = K'\ln E + L_0 \quad (2)$$

Figure 5:
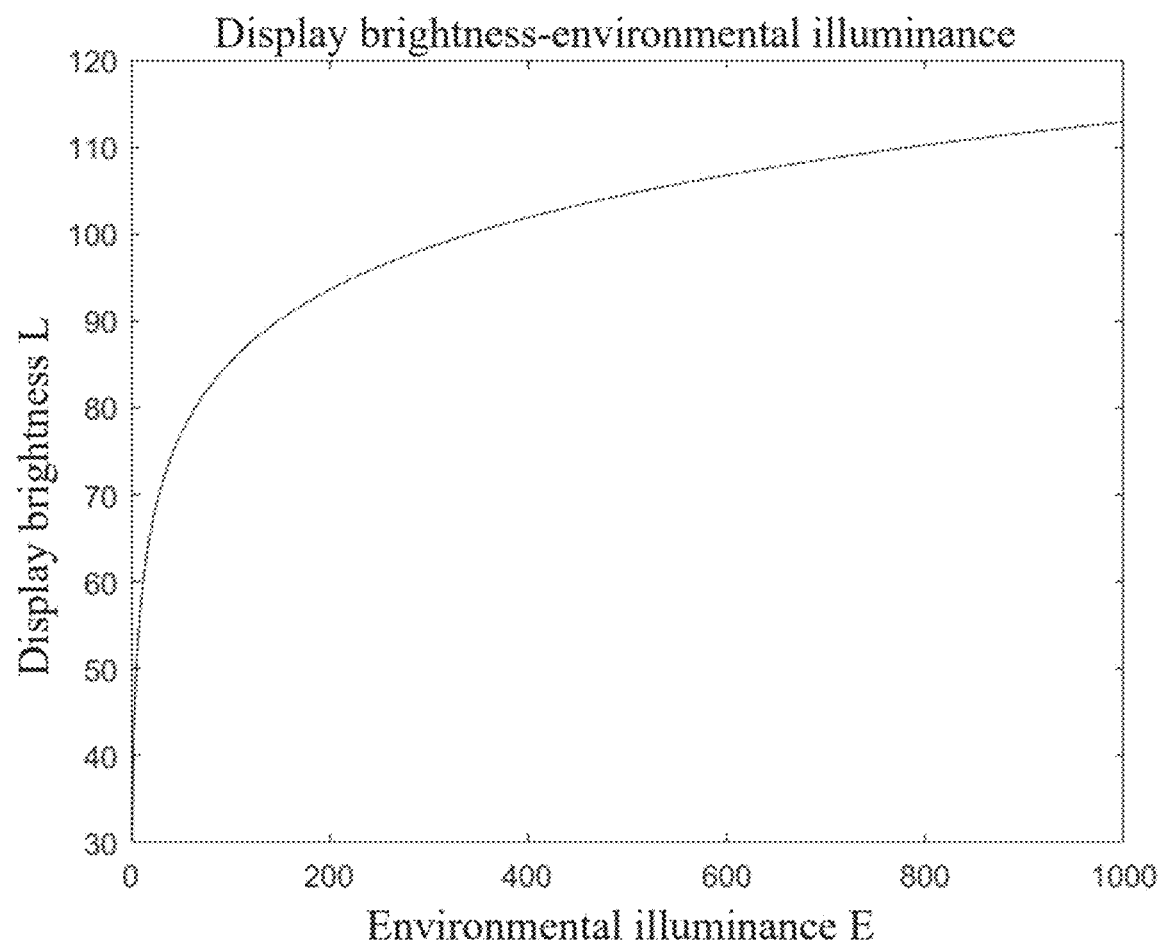
FIG. 5 is a schematic diagram of a display brightness-environmental illuminance relationship.

K' is a constant, and $L_0$ indicates the display brightness when the environmental illuminance is 0; specific values of K' and $L_0$ are to be obtained by experiments, and here, to show the corresponding relationship, K' and $L_0$ are set to suitable values to plot a corresponding curve between K' and $L_0$, as shown in FIG. 5.

To obtain the corresponding relationship, a visual perception-based subjective experiment is carried out as follows: 15 healthy subjects with eyesight over 1.0 and normal color vision are selected, and the subjects should not participate in a preparation experiment. A laboratory with a controllable n environmental illuminance 0-1000 Lux is prepared. An illuminance change gradient is set, and each subject is allowed to adjust the display brightness of the whole device under each illuminance, then a minimum brightness, an appropriate brightness and a maximum brightness are selected, and data are recorded.

It can be known, by observing the corresponding curve between the environmental illuminance and the display brightness in FIG. 5, that the slope of the first half of the curve is large, so it is necessary to design a small illuminance gradient segment for the first half, the slope of the second half of the curve is small, so a large illuminance gradient segment needs to be designed for the second half. In the invention, the gradient segment of the first half is set to 50 Lux, that is, 25 Lux, 75 Lux, 125 Lux, . . . , and 475 Lux; the gradient segment of the second half is set to 100 Lux, that is, 550 Lux, 650 Lux, . . . , and 950 Lux. A minimum brightness, an appropriate brightness and a maximum brightness at percentile 50 ($P_{50}$) under each illuminance environment are recorded. The reason why the percentile 50 is used is that it will not be affected by the maximum value and the minimum value as compared with the mean value. With the environmental illuminance as an independent variable and the minimum brightness, the appropriate brightness and the maximum brightness as dependent variables, three "display brightness-environmental illuminance" curve equations, which are a minimum brightness curve equation F1, an appropriate brightness curve equation F2 and a maximum brightness curve equation F3 respectively, are fit.

S7, the relationship between display brightness and environmental illuminance is saved into the MCU, and fine adjustment is performed using a coefficient. Considering the accuracy of the ambient light acquisition module 5, it is impossible to set a related display brightness for each environmental illuminance. So, a gradient segment is used for determining the display brightness. When the environmental illuminance is lower than 500 Lux, the gradient segment is set to 20 Lux, that is, the display brightness corresponding to the environmental illuminance 10 Lux is used as the display brightness corresponding to the segment 0-20 Lux, and the other segments are the same. When the environmental illuminance is higher than 500 Lux, the gradient segment is set to 50 Lux, that is, the display brightness corresponding to the environmental illuminance 525 Lux is used as the display brightness corresponding to the segment 500-550 Lux, and the other segments are the same. Three equations are obtained in S6, and considering that the fit curve is not definitely reasonable for all environmental illuminance gradient segments, all the three equations are saved in the MCU, and a weighted mean with an adjustable coefficient is introduced. During initialization, a weight coefficient α of the minimum brightness curve equation F1 and a weight coefficient c of the maximum brightness curve equation F3 are set to 0, and a weight coefficient b of the appropriate brightness curve equation F2 is set as 1, thus obtaining a final brightness F.

$$F=aF1+bF2+cF3 \qquad (3)$$

In addition, two keys "brightness+" and "brightness−" are added in the driving and adjustment module 2; if a user feels that an overall brightness within a current environmental illuminance gradient segment is relatively low, the key "brightness+" is pressed to decrease a and b by one step size and increase c by two step sizes; and if the user feels that the overall brightness within the current environmental illuminance gradient segment is relatively high, the key "brightness−" is pressed to decrease b and c by one step size and increase a by two step sizes, wherein an appropriate value of the step size is selected according to experimental results, and a, b and c will not change anymore when increased to 1 or decreased to 0. By designing the coefficient for fine adjustment, the adaptive adjustment method can be suitable for more users.

To sum up, in this embodiment, the overall specifications and parameters of the holographic waveguide display device are determined first; then, related devices are selected, and the whole device is constructed; after that, an experiment for calibrating the relationship between display brightness and environmental illuminance is carried out, and equations obtained by the experiment are saved in the MCU; and for different users, a weight adjustment module is added to realize adaptive adjustment of the display brightness finally.

What is claimed is:

1. An adaptive adjustment method for a brightness of a holographic waveguide display device, wherein an adjustment system adopted by the adaptive adjustment method comprises a computer control module, a driving and adjustment module, a micro image source display module, an optical waveguide transmission module and an ambient light acquisition module, wherein the computer control module is used for providing a control signal and a video signal to a micro image source; the driving and adjustment module is used for illuminating the micro image source and changing display parameters of the micro image source; the micro image source display module is used for generating light information and transmitting the light information to the optical waveguide transmission module; the optical waveguide transmission module is used for transmitting light of the micro image source to realize augmented reality (AR) display; the ambient light acquisition module is used for acquiring illuminance information of ambient light and feeding the illuminance information back to the driving and adjustment module in real time to allow the driving and adjustment module to adjust brightness of the micro image source display module according to the illuminance information; the driving and adjustment module comprises a decoding chip and a micro control unit; the micro image source display module comprises a micro display and a driving circuit; the optical waveguide transmission module comprises a holographic waveguide plate and a collimating lens; the holographic waveguide plate comprises an in-coupling grating, a glass substrate and an out-coupling grating; the ambient light acquisition module is an illuminance sensor; the adaptive adjustment method comprises the following steps:

S1: determining overall specifications and feature parameters of the holographic waveguide display device;

S2: determining a type of each module of the adaptive adjustment system according to the overall specifications and the feature parameters;

S3: after the type of each module is determined, connecting the computer control module, the driving and adjustment module and the micro image source display module by a hardware circuit, and then writing software drive codes into the micro control unit to preliminarily illuminate the micro image source display module;

S4: combining the micro image source display module which has been illuminated in S3 and the optical waveguide transmission module to allow light of the micro image source display module to pass through the optical waveguide transmission module to reach human eyes to realized AR display;

S5: embedding the ambient light acquisition module in the holographic waveguide display device constructed in S1-S4; establishing communication between the ambient light acquisition module and the micro control unit in the driving and adjustment module to transmit the illuminance information, and transmitting, by the micro control unit, the illuminance information to the computer control module to display the illuminance information; finally, comparing the illuminance information with a result obtained by a standard illuminometer to correct illuminance data of the ambient light acquisition module;

S6: carrying out a visual perception-based subjective experiment to obtain a relationship between display brightness and environmental illuminance; and S7: saving the relationship between the display brightness and the environmental illuminance in the micro control unit, and performing fine adjustment using a coefficient;

wherein S6 comprises the following sub-steps:

S6.1: establishing the relationship between the display brightness L and the environmental illuminance E:

$$L=K'lnE+L_0 \qquad (2)$$

wherein, K' is a constant, and Le indicates the display brightness when the environmental illuminance is 0;

S6.2: carrying out the visual perception-based subjective experiment, setting an illuminance change gradient, allowing a subject to adjust display brightness of the holographic waveguide display device under each illuminance, then selecting a minimum brightness, an appropriate brightness and a maximum brightness, and recording data; and S6.3: designing environmental illuminance gradient segments, and recording the minimum brightness, the appropriate brightness and the maximum brightness at percentile 50 under each illuminance environment; with the environmental illuminance as an independent variable and the minimum brightness, the appropriate brightness and the maximum brightness as dependent variables, fitting three display brightness-environmental illuminance curve equations, wherein the three display brightness-environmental illuminance curve equations are a minimum brightness curve equation F1, an appropriate brightness curve equation F2 and a maximum brightness curve equation F3 respectively;

wherein saving the relationship between the display brightness and the environmental illuminance in the micro control unit in S7 comprises: saving F1, F2 and F3 in the micro control unit, and introducing a weighted mean with an adjustable coefficient; and during initialization, setting a weight coefficient $\alpha$ of the minimum brightness curve equation F1 and a weight coefficient c of the maximum brightness curve equation F3 to 0, and setting a weight coefficient b of the appropriate brightness curve equation F2 as 1, thus obtaining a final brightness F:

$$F=aF1+bF2+cF3.$$

2. The adaptive adjustment method for the brightness of a holographic waveguide display device according to claim 1, wherein performing fine adjustment using the coefficient in S7 comprises: adding two keys "brightness+" and "brightness−" in the driving and adjustment module; when a user feels that an overall brightness within a current environmental illuminance gradient segment is relatively low, pressing the key "brightness+" to decrease a and b by one step size and increase c by two step sizes; and when the user feels that the overall brightness within the current environmental illuminance gradient segment is relatively high, pressing the key "brightness−" to decrease b and c by one step size and increase a by two step sizes, wherein a, b and c do not change anymore when increased to 1 or decreased to 0.

* * * * *